Sept. 20, 1971 J. C. ABROMAVAGE ET AL 3,606,045
INSTRUMENT TRANSPORT AND POSITIONING SYSTEM
Filed Nov. 19, 1969 7 Sheets-Sheet 1

INVENTORS
JOHN C. ABROMAVAGE
JAMES F. GEORGE

BY David H. Semmes
ATTORNEY

INVENTORS
JOHN C. ABROMAVAGE
JAMES F. GEORGE

BY David H. Semmes
ATTORNEY

Sept. 20, 1971  J. C. ABROMAVAGE ET AL  3,606,045
INSTRUMENT TRANSPORT AND POSITIONING SYSTEM
Filed Nov. 19, 1969  7 Sheets-Sheet 5

INVENTORS
JOHN C. ABROMAVAGE
JAMES F. GEORGE

BY David H. Semmes
ATTORNEY

United States Patent Office 3,606,045
Patented Sept. 20, 1971

3,606,045
INSTRUMENT TRANSPORT AND POSITIONING SYSTEM
John C. Abromavage, Tempe, and James F. George, Phoenix, Ariz., assignors to Advanced Management Engineering & Research Co., Phoenix, Ariz.
Filed Nov. 19, 1969, Ser. No. 878,079
Int. Cl. B65g 21/22
U.S. Cl. 214—89
10 Claims

ABSTRACT OF THE DISCLOSURE

An instrument transport and positioning system for use in multiphasic medical examinations screening laboratories of a type where a test sequence phase is conducted in a plurality of juxtaposed wedge shaped test chambers surrounding a central core area wherein each test chamber is adapted to encompass therein for a given test all instruments required to perform predetermined tests in a prephased sequence with inexpensive instruments located in each test chamber, expensive equipment being centrally located in the central core and inter-connected with each test chamber via a cable, with still further expensive equipment mounted on a circular track above the wedge shaped test chamber adapted for selective vertical placement in or removal from each chamber. The equipment mounted on the track is adapted for movement along the track and lowering or raising through a ceiling door in the chambers with the ceiling door and raising and lowering mechanism for the equipment being phased in the test time sequence and automatically operable by means of coacting devices selectively operated upon given increments of movement of the equipment around said track.

BACKGROUND OF THE INVENTION

Multiphasic screening constructions and laboratories have been devised heretofore and one such improved arrangement is shown and described in U.S. Pat. 3,470,871, dated Oct. 7, 1969, entitled Multiphasic Screening Laboratory for Conducting Medical Examinations, and assigned to a common assignee of the present application. The present application constitutes improvements of certain mechanisms for transporting and positioning instruments in selected ones of test chambers as shown in said aforementioned patent.

The present invention incorporates the basic concepts of said prior patent and reference is made thereto for the general method of conducting the medical examinations. Our copending patent applications, Ser. No. 878,094, entitled Multiphasic Medical Examinations Screening Laboratory Construction, filed Nov. 25, 1969, and Ser. No. 878,078, entitled Ceiling Entrance Door System, filed Nov. 19, 1969, and both assigned to a common assignee herewith, respectively disclose an improved type of construction and arrangement over the aforesaid patent and a ceiling door construction permitting ready insertion in or removal from a test chamber of the further expensive equipment but such structures while broadly incorporating equipment transport and positioning means do not include a desirable optimum in this regard.

SUMMARY OF THE INVENTION

The present invention constitutes an improvement of a system and apparatus usable in laboratories of the nature described primarily with respect to an instrument transport and positioning system operable in timed sequence to lower equipment into a test chamber for use therein and subsequent raising of the equipment and removal from a test chamber for subsequent transfer to a further test chamber in which it is to be used. The instrument transport and positioning system is preferably electro-hydraulic and operates to effect sequential transfer of instruments between test rooms in phase with a prephased test method and sequence. Positive action and positioning of the instruments is required together with positive timed lowering or raising of the equipment coordinated with opening and closing of ceiling entrance doors for the individual test chambers and means are included for proper alignment of equipment and apparatus during raising, lowering and rotational motion or movement of the equipment pieces.

Additional objects and advantages of the invention will be more readily apparent from the following detailed description of an embodiment thereof when taken together with the accompanying drawings in which:

DESCRIPTION OF THE PREFERRED EMBODIMENT

Figure 1:
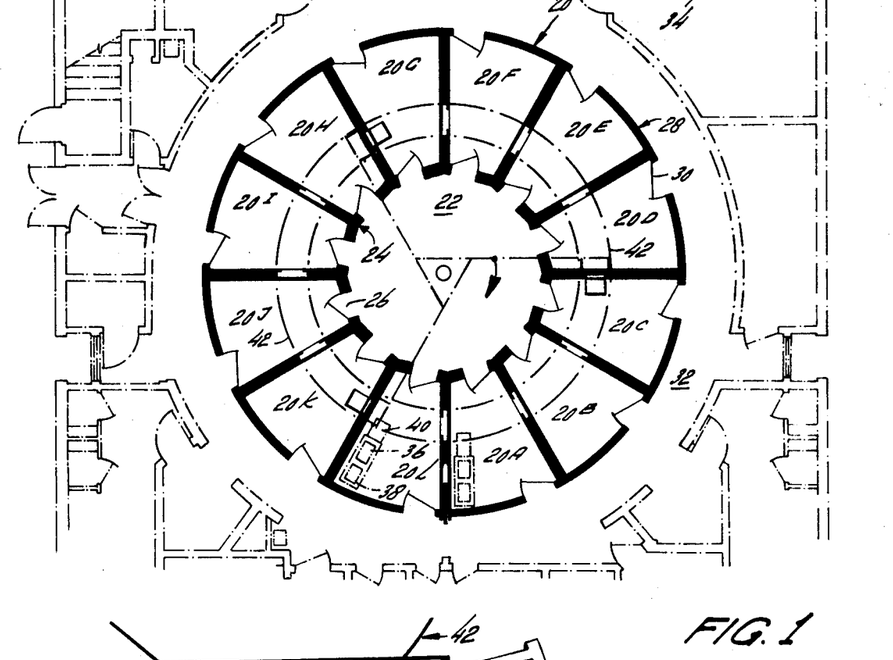
FIG. 1 is a schematic floor plan illustrating a multiphasic screening laboratory with emphasis on a test sequence phase laboratory portion.
Figure 2:
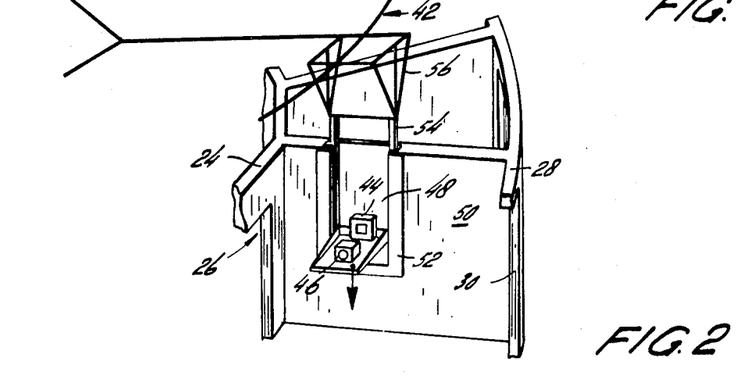
FIG. 2 is a fragmentary elevational perspective view of a test chamber showing the disposition therein of transported test equipment in accordance with the present invention.

Referring now in more detail to the drawings, in FIG. 1 there is shown for a multiphasic screening laboratory a test sequence portion 20 consisting of a plurality of individual wedge shaped test chambers 20A–20L, twelve in number, in a circular array about a central core 22 and separated therefrom by an inner wall or partition 24 with a plurality of individual doors 26 intercommunicating the central core and the individual test chambers. An outer wall or partition 28 forms the outer extremeties of the individual test chambers and doors 30 provide external access to a corridor 32 and to a plurality of additional spaces or rooms suitable for additional functions such as test, clerical, storage space, etc. This portion of the construction is indicated generally in broken lines at 34. This latter portion 34 can comprise a portion of the history phase of the examination laboratory, the details of which are not shown and reference is here made to the aforementioned patent and pending patent applications disclosing overall laboratory arrangements.

Each of the individual test chambers associated with the central core is adapted to have ararnged therein all instruments to perform all the predetermined tests. Inexpensive instruments such as used in visual acuity or tonemetry, for example, are provided in each test chamber, such as indicated for example as consisting of a visual acuity test device 36 (Project-O-Chart (AO) through mirror to screen), a tonemetry test device 38 and a table or the like 40. The tonemetry device can consist of a Schiotz Tonometer and Ophthaine Anesthetic arrangement and the table is usable for a patient for drop installation to dilate the pupil for the tonemetry examination. Additional items can be included in the individual test chambers for convenience and preferably, is permanently incorporated therein, of an inexpensive nature.

In the overall laboratory as shown and described in detail in the above mentioned patent and patent applications, expensive equipment is located within the central core 22 and, while not shown, can consist in, for example, an audiometer, electrocardiograph, blood pressure measuring device, pulse measuring device, temperature measuring device, respiration measuring device, etc. Each of such measuring devices in the central core is connected to each of the test chambers via a set of cables, not shown, for each of the test chambers.

Test devices or equipment defined as more expensive is mounted on a circular track 42, shown in broken lines in FIG. 1 for orientation in the laboratory, and which is located above the individual test chambers above the ceiling thereof and preferably located in proximity to inner wall 24. Such more expensive equipment can for example consist of a spirometer indicated at 44 (Med-Science-Model 470) and a fundus camera as at 46 (Carl Zeiss). These more expensive items of equipment are adapted to be circularly moved by means of the overhead track 42 in juxtaposition over each of the individual test chambers in any desired sequence, phase or manner.

Figure 4:
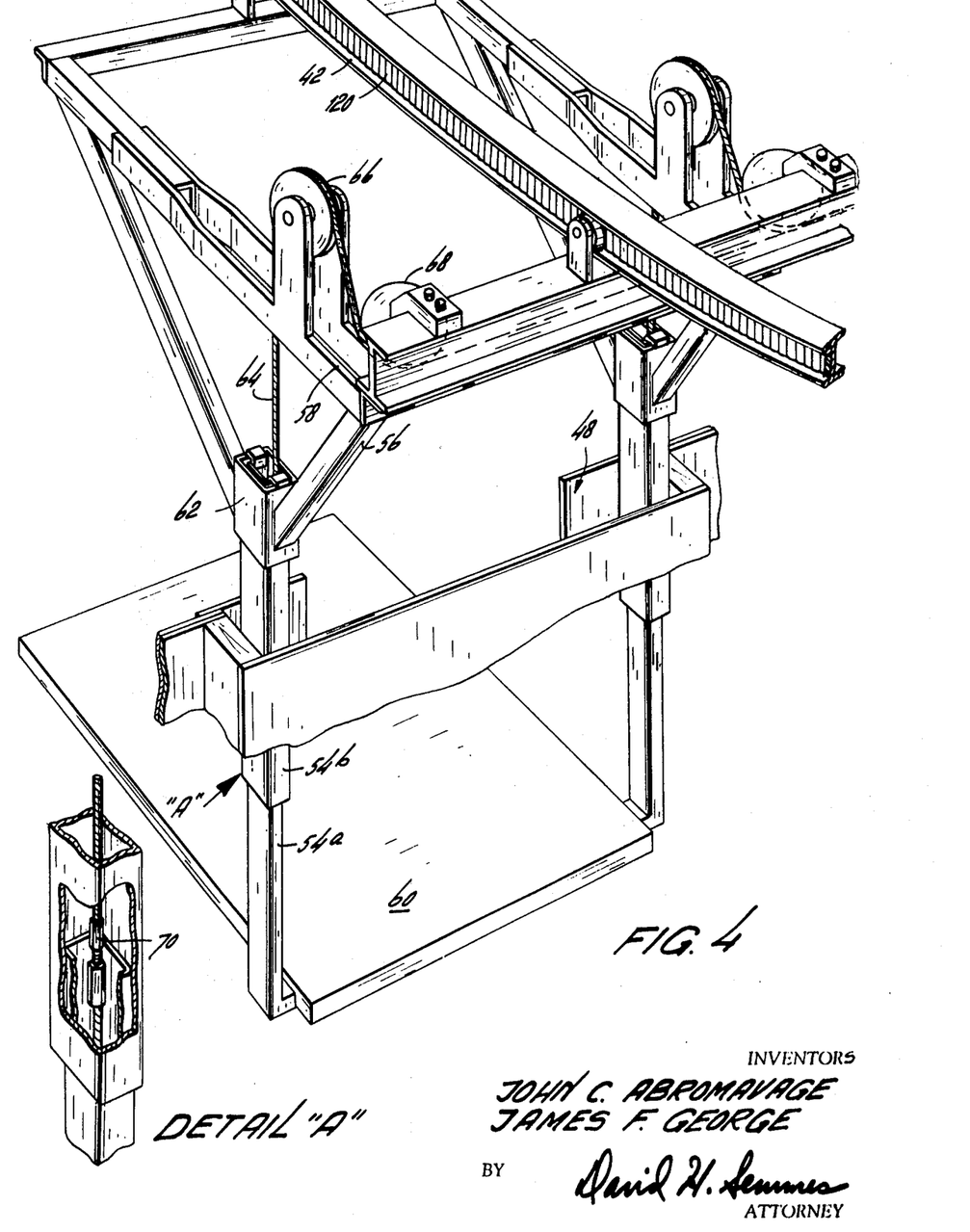
FIG. 4 is a fragmentary perspective view, parts being broken away for clarity, of apparatus and mechanism for raising and lowering of an equipment piece—Detail A is a broken away fragmentary perspective view of a portion of the structure where designated of FIG. 4.

In operation, the more expensive equipment is lowered into a selected test chamber as required for a test sequence and to this end movement about the circular track and raising and lowering of the equipment with respect to the individual chambers is timed and automatically actuated. In order to permit this insertion within each test chamber there is preferably provided overhead ceiling doors, not shown, as shown in more detail in our aforementioned patent application, Ser. No. 878,078, and the circular movement of the equipment and lowering or raising into the chambers are all in timed sequence. Additionally C-shaped slots 48 are provided in a partition wall 50 of a test chamber. The C-shaped slots are appropriately dimensioned and framed as at 52 to provide proper and appropriate guidance for coacting with telescopic type arms generally indicated at 54 mounted on circular track 42 through supports 56 attached to a frame 58 which is mounted on the track for circular movement thereabout. The telescopic arms include lower portions 54A to which is attached an instrument platform 60 which carry the instruments 44 and 46. The lower arm portions 54A are telescopically mounted within upper arm portions 54B, FIG. 4—Detail A, with the upper arm portions being telescoped within casings 62 in the nature of sleeves which are secured to supports 56. As shown in FIG. 4, a cable or rope 64 is attached to lower arm portion 54A and passes over upper pulley 66, thence around pulley 68 and secured within a fixed pulley and cable system, to be hereinafter described, for raising and lowering lower arm portion 54A with respect to arm portion 54B and additionally portion 54B with respect to sleeve 62. Turn buckle or adjustment connecting means 70 are provided for adjustment of the cable length. The arm portions 54A and 54B in actuality constitute inside and outside sliding tubes with respect to the sleeve. Teflon or the like bearing cases are preferably provided with in the sleeves for self-lubricating characteristics and reducing sliding friction between the arm portions.

Figure 3:
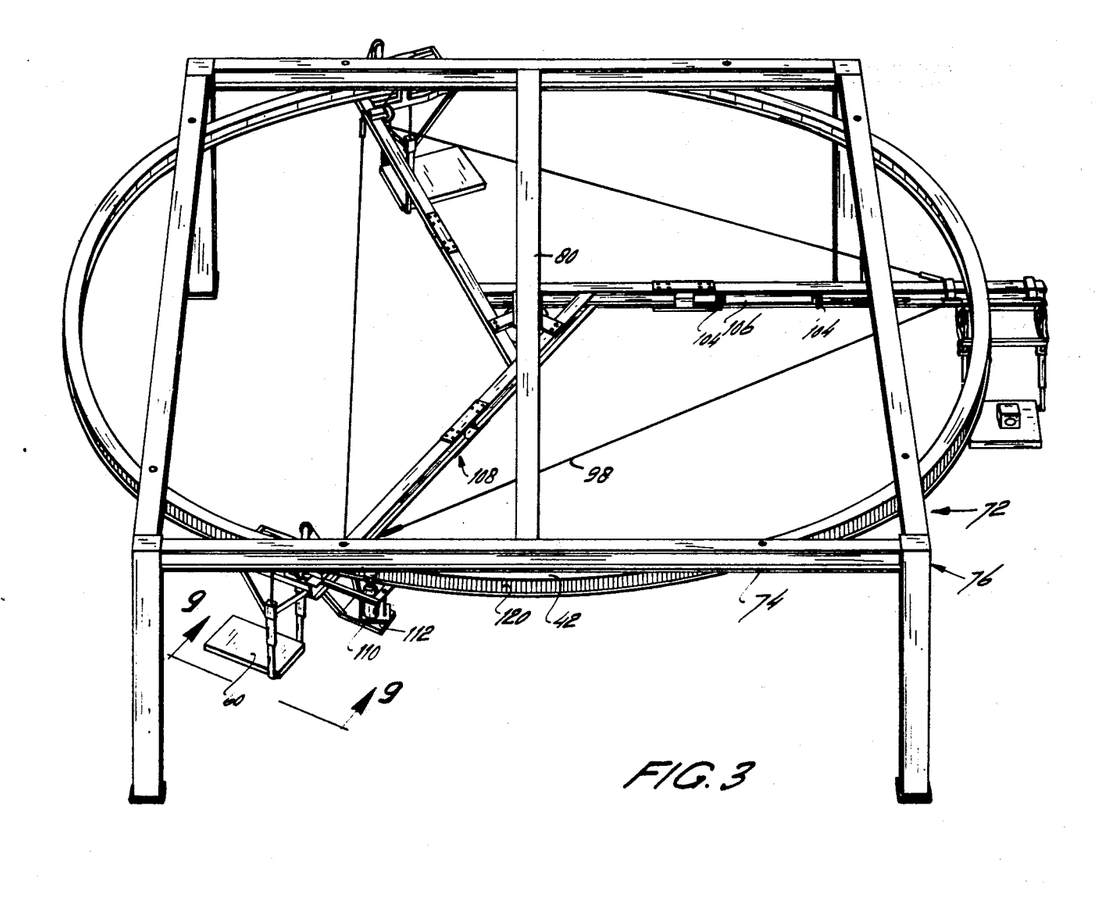
FIG. 3 is a fragmentary perspective view showing in general the equipment transporting and positioning system and apparatus.
Figure 5:
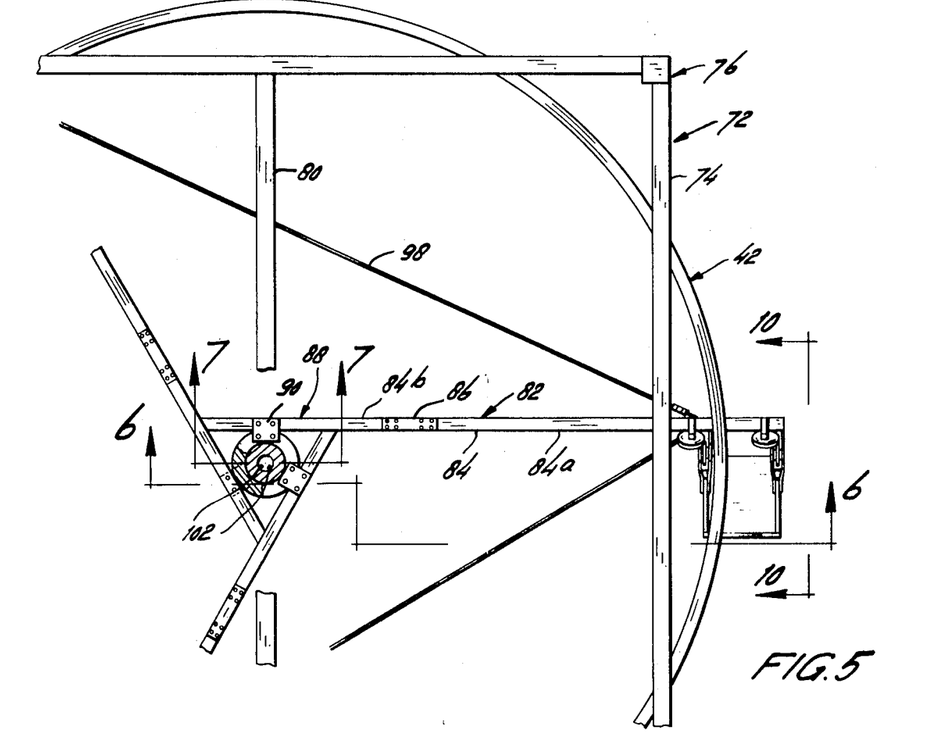
FIG. 5 is a fragmentary plan view of a portion of the transport and positioning system for one equipment station.
Figures 6, 7, 8:
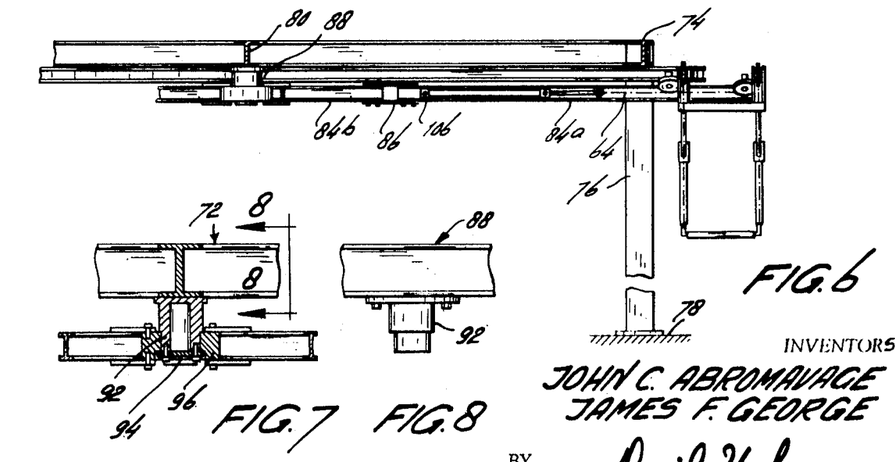
FIG. 6 is an elevational view substantially on line 6—6 of FIG. 5.
FIG. 7 is an elevational view, partly in section, taken on line 7—7 of FIG. 5.
FIG. 8 is a fragmentary elevational view taken on line 8—8 of FIG. 7.
Figure 9:
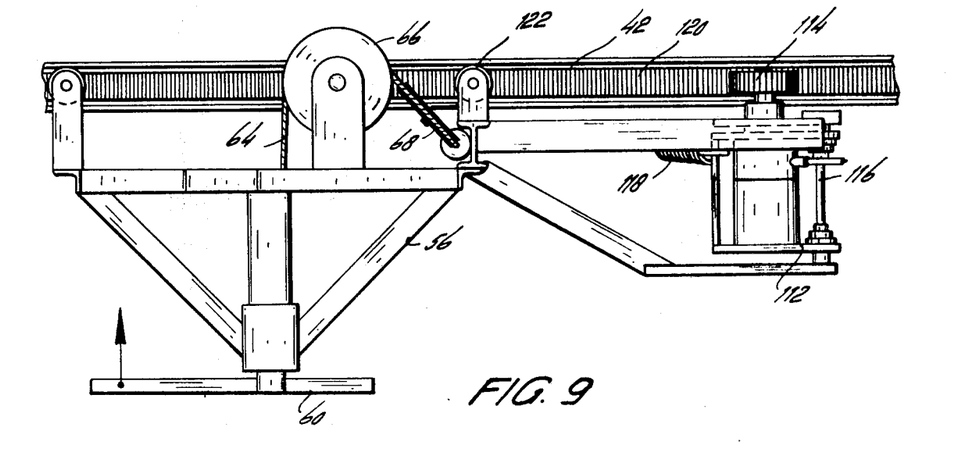
FIG. 9 is an elevational view of one instrument carrying station and vertical positioning apparatus taken substantially along line 9—9 of FIG. 3.
Figure 10:
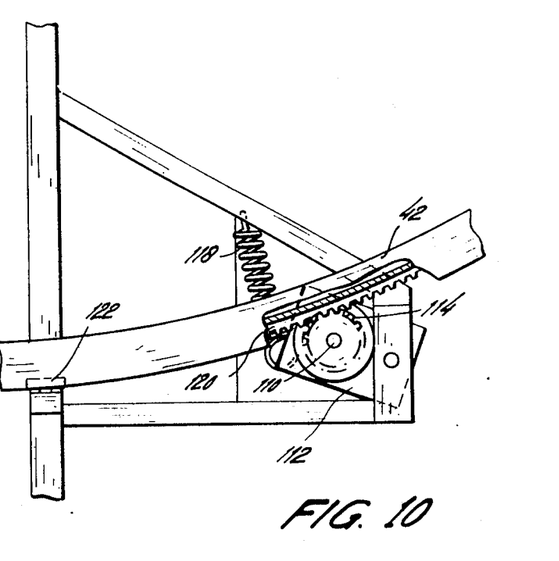
FIG. 10 is a fragmentary enlarged plan view, parts being broken away, taken substantially along line 10—10 of FIG. 5.

The mechanism for circular movement of the instruments carried on the individual platforms and the lowering and raising mechanism is more readily shown in, for example, FIGS. 3, 5 and 6. A support frame generally designated 72 includes side members 74, support legs 76 adapted for placement on a surface at 78 and a cross beam 80. The circular track 42 preferably consists of an H beam attached to the support frame 72. The platform carrying mechanism includes a frame generally designated 82 including beams 84 which can again be H beams and extruded for example of aluminum, consisting of outer segments 84A and inner segments 84B interconnected by adjusting brackets 86. The arms 84 are arranged in a spider array with the inner ends connected to a center hub section 88 by means of brackets 90 or the like. The center hub includes a fixed central portion 92 which together with a plate 94 forms a substantially shaped configuration and engageable by bearings 96 on the inner ends of the arms for rotation thereabout. Interconnecting strengthening and adjusting cables 98 are connected to the arms 84 with the inclusion of adjusting turn buckles 100. The center hub section also incorporates a rotating union into which hydraulic lines 102 are connected and which lead to a source of hydraulic pressure and actuating valves as will hereinafter appear. Hydraulic lines 104 are connected from the union to platform elevation cylinders 106 which have their rods connected to the cables 64 at their ends and are operable to raise and lower the instrument platforms. The hydraulic lines and cylinder for the platforms are within the channel of the arms. Additional motor hydraulic lines 108 interconnect the rotating union and a drive motor 110. The motor is supported on a platform 112 associated with one of the platform carriers and includes a toothed gear wheel 114 on its shaft end. The platform 112 is preferably pivotably mounted on shaft 116 and a spring 118 is connected to maintain the gear 114 in operational engagement with a reinforced rubber geared track 120 formed within the outer channel of track 42 as shown in FIG. 10. Upon operation of motor 110 the circular track which serves to support the platforms and support members therefor will permit rotation of the platforms and carrying arms through interengagement of the track and drive gear. For operational purposes, support wheels 122 (FIG. 9) in the nature of polyurethane or the like interconnect and support the frame 58 in the channel of the track.

Figure 11:
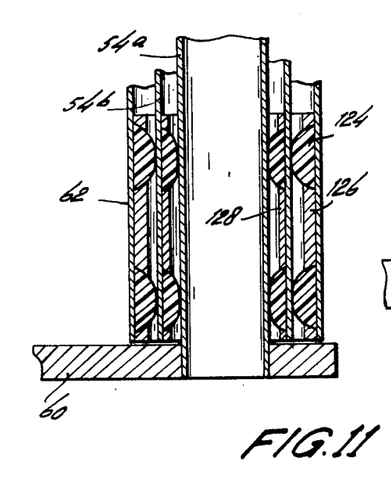
FIG. 11 is a fragmentary sectional view of equipment loading platform and telescopic mount disclosing circumferential aligning means for the equipment platform.

The telescopic arms are in the nature of rectangular thin walled tubes rigidly fixed to the instrument platform and to which the cables for raising or lowering the same are attached and actuatable by means of the cylinders as aforementioned. In the embodiment shown three platforms are incorporated although the number could vary depending upon the test sequence to be conducted and depending upon the number of test chambers into which it is desired to extend the instruments on the platforms. Alignment of the platforms, and therefore the instruments thereon, is ensured during raising and lowering with reference to the circumferential direction in a manner shown in FIG. 11. A plurality of Teflon slider blocks or the like 124 are secured to the inner faces of the bearing case or sleeve 62 and the outside sliding tube 54B in any appropriate manner such as by blocks or plates 126 consisting of respectively bolted aluminum blocks and spot welded steel plates 128. This structure utilizes to advantage the off center weight position of the instruments on the platforms relative to the telescoping tubes. Alignment in the lateral or radial direction is maintained by center loading the instruments in the lateral direction causing equal tension in the cables for a self-aligning fixation. Should alignment not be properly maintained at all times by these circumferential and lateral fixations, additional Teflon slip blocks can be included and positioned to give a quick return to the self-alignment situation. Alignment in rotational motion is maintained by a strut-cable combination. Both angular and radial dimensions between the package carriers are held rigid by the structure triangular set of three triangles formed by the three strut or arm combination compression and bending resistant members.

Operation of the mechanism will be described with references to FIGS. 12 and 13. To raise the three instrument panels or platforms out of the C-shaped slots in the test room walls tabs on the ceiling entrance doors in the system approach proximity switches on the three instrument carriers. These switches trigger a control circuit which actuates valve I (FIG. 13) which is located in the center hub section which retracts the three cylinders I, II and III which pulls the three sets of cables 64 leading to the individual instrument platforms to thereby raise the sets of telescoping tubes or arms 54A, 54B and therethrough raise the instrument platforms. Each of the cylinder controls as shown includes a two way valving for extension and retraction and across port relief valve. The valve I is operated by a solenoid for example being a 12 v. DC 10 watt type. Flow control valves are included in the various system lines where indicated. Rotational motion is initiated when a proximity switch is approached by a tab on the slowest package platform raising cylinder. This proximity switch triggers the control circuit actuating valve, valve II, again solenoid actuated, to activate the hydraulic orbit motor which drives the entire three platform and center hub combination around the overhead H beam track via the geared reinforced rubber track. Rotational motion is stopped when a proximity switch on the package carrier approaches a tab on the test room ceiling, deactivating valve II via the control circuit. A relief valve is incorporated in the circuit across the orbit motor as shown. The three instrument platforms are lowered into the C-shaped slots to a point where the under surfaces of the platforms are approximately 50 inches above the test room floors, the upper position placing the bottom surfaces approximately 84½ inches above the compartment floor. The lowering action is produced by tabs on the ceiling entrance door system doors approaching proximity switches on the three platforms, in turn triggering the control circuit to extend the three cylinders, allowing the weight of the instrument packages to pull the platforms down. The overall hydraulic circuit is shown schematically in FIG. 13. The rotating union in the center hub portion for fluid supply can constitute a Deublin rotating union or similar device.

Figure 12:
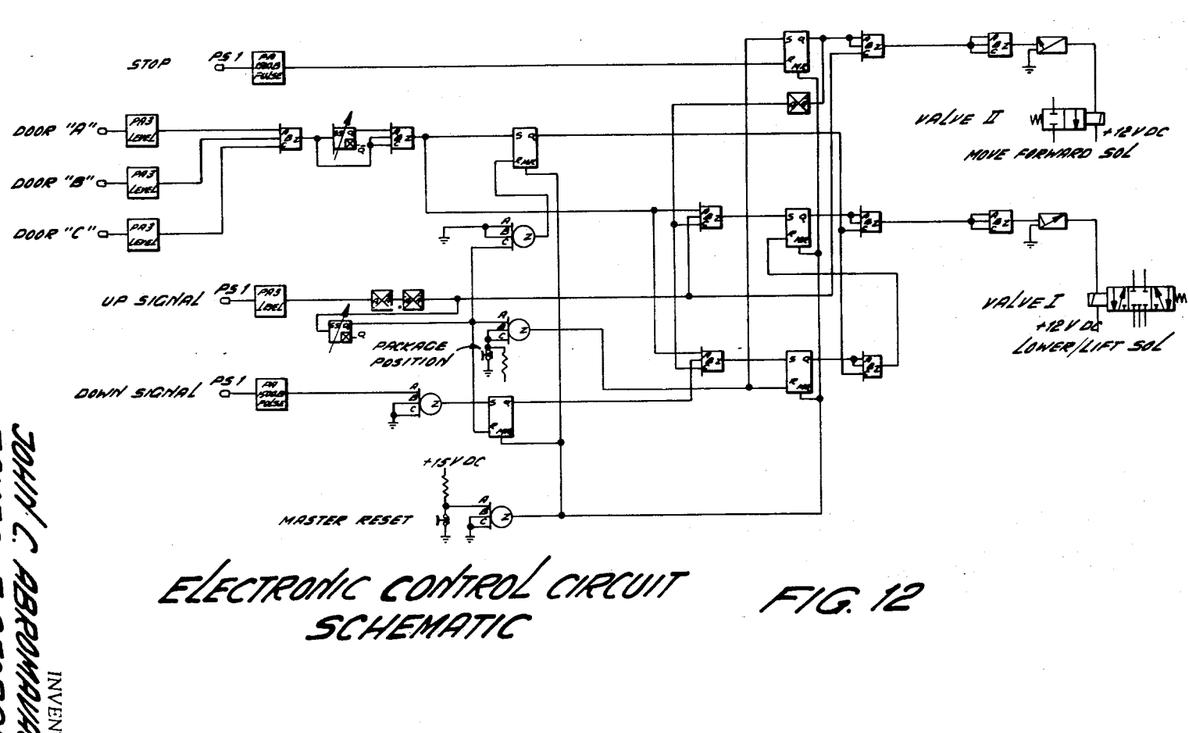
FIG. 12 is an electronic control circuit schematic.
Figure 13:
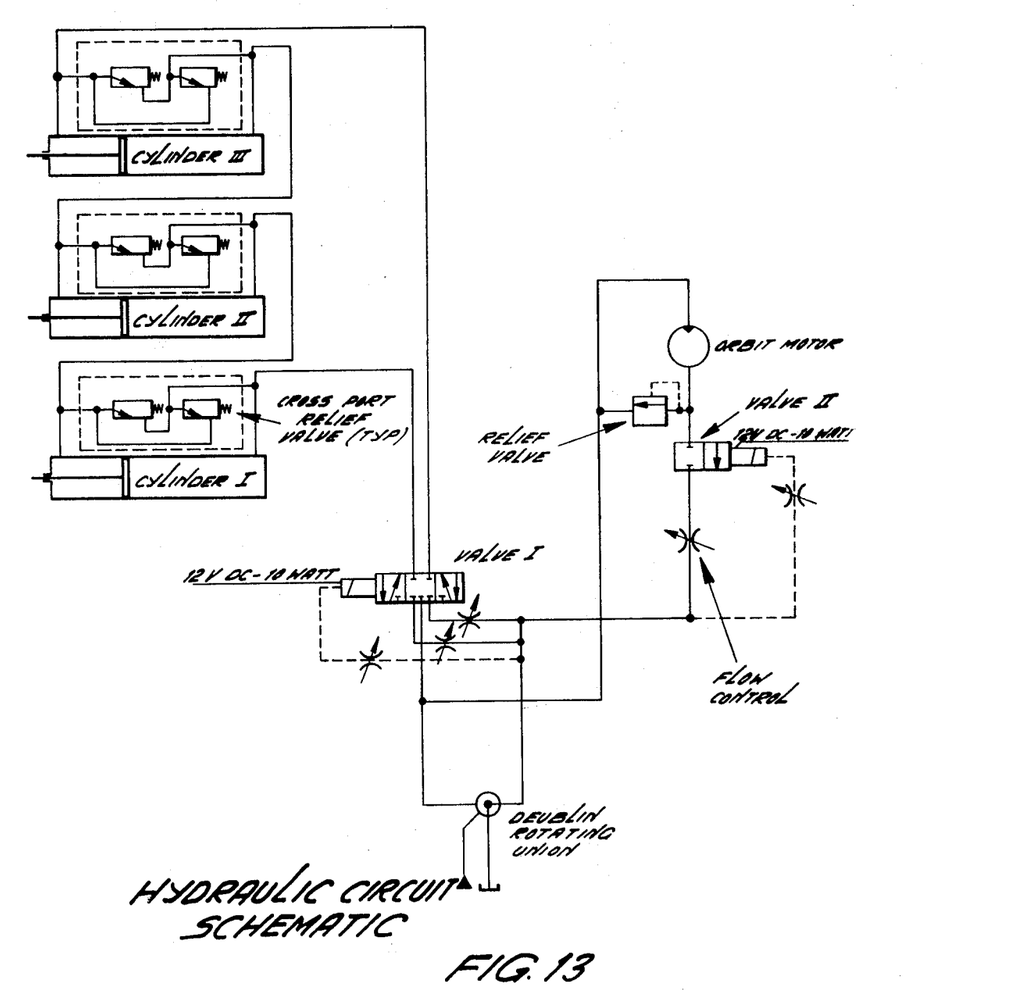
FIG. 13 is a hydraulic circuit schematic.

FIG. 12 discloses the electronic control circuit schematically. As shown, the proximity switches for the three doors A, B and C are schematically represented. which are connected in the control circuit to actuate valve I to retract the cylinders for pulling the cables to raise the sets of instrument platforms. Rotational motion is initiated through the package position switch when approached by a tab on the slowest package platform raising cylinder. This is a proximity switch which triggers the control circuit actuating valve II to thereby activate the hydraulic motor for driving the carrying system rotationally around the track. The proximity switch on the package carrier when it approaches a tab on the test room ceiling deactivates valve II via the control circuit and rotational motion is stopped.

Tabs on the ceiling entrance door system doors are arranged to approach proximity switches on the three carriers or instrument platform supports when lowered into the C-shaped slots to a point where the under surfaces are at the desired distance above the test chamber floors. The tabs in conjunction with the proximity switches in turn triggers the control circuit to extend the three cylinders to permit lowering of the platforms due to the instrumen weight. The remainder of the circuit for effecting the automatic control and the components used will be apparent from the schematic of FIG. 12. Obviously specifically different circuitry and components could be used to effect the given operational steps and phases. A master reset switch is also incorporated in the circuit for desired operational control.

The instrument transport system as shown is operable to effect, by means of the electrohydraulic interconnected system the sequential transfer of instruments between test rooms including circular movement and raising and lowering of the platforms. The arrangement is such that the platforms are moved together conjointly as also raised or lowered conjointly. In the arrangement shown three platform packaegs are incorporated and depending upon the preset cycle and circuit can be inserted in or withdrawn from the individual chambers in a phased pattern as desired. Use simultaneously in a greater or lesser number of rooms can be incorporated in the system and a greater or lesser number of platforms can be moved in the same manner.

Manifestly minor changes in details of construction can be effected in the invention without departing from the spirit and scope thereof as defined in and limited solely by the appended claims.

We claim:
1. An instrument transport and positioning system comprising:
(A) a circular track;
(B) an instrument support carrier frame movably mounted on said track and including:
  (i) telescopic legs secured at their upper ends to said carrier frame;
  (ii) an instrument platform secured to the lower ends of a said leg, said telescopic legs being extensible and retractable for selective lowering and raising of said instrument platform;
  (iii) cables attached at one end thereof to an inner one of said telescopic legs;
  (iv) a pulley system on said carrier frame, said cables being operatively entrained over pulleys in said system;
  (v) hydraulic cylinder piston means on said frame operatively attached to said cables at the rod ends thereof; and
  (vi) a hydraulic pressure system operatively associated with said cylinders, said cylinder pistons, hydraulic fluid under pressure and said cables constituting said means for selectively lowering and raising said instrument support therethrough;
(C) an instrument support operatively attached to said carrier frame, including:
  (i) a central hub portion and arms radiating therefrom in a spider network and connected at their outer ends to and supporting said instrument support; and
  (ii) wheels interengaging said instrument support and said circular track for circular movement of said carrier frame and said instrument support;
(D) means for circularly moving said carrier frame and support therewith around said track to a plurality of spaced positions; and
(E) means for selectively lowering and raising said instrument support at a said position.

2. A system as claimed in claim 1, said central hub portion including a rotating union interconnected in the hydraulic system and outlets therefrom operatively interconnecting said cylinders and means for selective introduction of fluid under pressure to said cylinders operable upon a said support being at a said spaced position for automatically lowering or raising said instrument platform at a said position.

3. A system as claimed in claim 2, said means for circularly moving said carrier frame and support therewith around said track to a plurality of spaced positions comprising a geared track encircling and attached to said circular track and a drive motor and gear thereon engaged with said track for coacting drive thereof.

4. A system as claimed in claim 3, including intercoacting means operatively attached to said instrument support and the carrier frame for activating the drive motor for incremental rotation of said carrier frame in a predetermined spaced position with respect to a raised position of an instrument support.

5. A system as claimed in claim 4, said drive motor being hydraulic and interconnected in a hydraulic system and an electronic circuit including control and operation of said drive motor in phased sequence of operation moving said carrier frame and instrument support to said spaced-positions.

6. A system as claimed in claim 1, and including means for aligning the instrument platform during raising and lowering, alignment in a circumferential direction being accomplished by Teflon slip blocks interengaging telescopic leg portions utilizing off center weight position of instruments on the platform relative to the telescopic legs, alignment in lateral direction being maintained by center loading of instruments in the lateral direction for equal tension on the components comprising the means for selective lowering and raising of the instrument support.

7. A system as claimed in claim 1, and including cables interconnecting said arms forming said carrier frame, angularly disposed reinforcing arms engaging between said carrier frame and said instrument support, said arms and said cables constituting a structural triangular set of a plurality of triangles and serving to maintain alignment of said instrument supports during rotational movement.

8. A system as claimed in claim 1 in combination with a multiphasic screening laboratory consisting of a plurality of individual wedge-shaped test chambers in a circular array separated by partitions, said support carrier frame mounting a plurality of instrument supports in a spaced array over said individual test chambers, said plurality of instrument supports being collectively and simultaneously lowered and raised into and out of a plurality of said individual test chambers.

9. A system as claimed in claim 8, said partition walls having C-shaped slots vertically disposed therein, said instrument supports being slidably engageable in said slots upon lowering and raising movements of the instrument supports to position instruments carried thereon in said test chambers.

10. A system as claimed in claim 9, a ceiling above said test chambers, a ceiling entrance door in said ceiling for individual ones of said test chambers, said ceiling entrance doors being movable to open and closed positions in automatic timed sequence with movement of said carrier frame and instrument supprots in a manner permitting insertion of the instrument supports into said test chambers at said plurality of spaced positions.

References Cited

UNITED STATES PATENTS

| | | | |
|---|---|---|---|
| 809,799 | 1/1906 | Harding | 104—89X |
| 2,573,857 | 11/1951 | McCain | 104—89X |
| 3,180,279 | 4/1965 | Thiboult | 104—93X |
| 3,438,510 | 4/1969 | Fawell | 212—128 |

ALBERT J. MAKAY, Primary Examiner

U.S. Cl. X.R.

104—89; 198—19; 212—128